Figure 1:
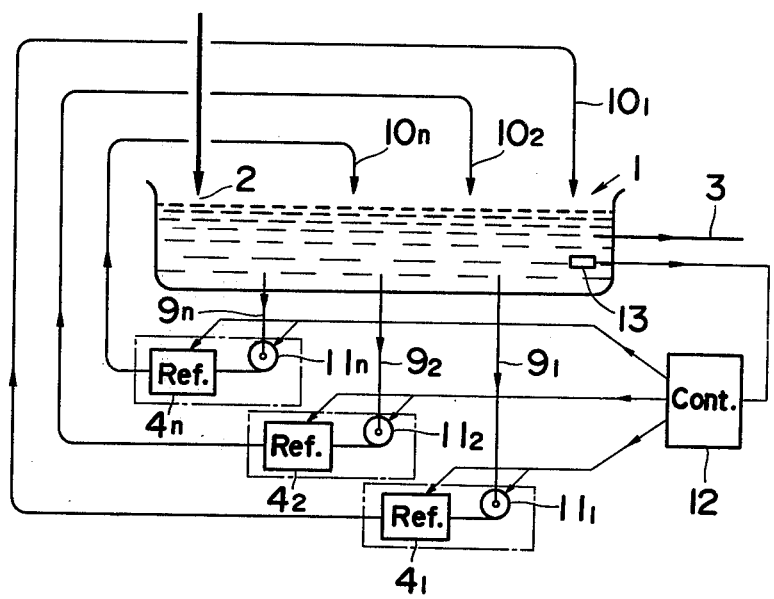

United States Patent [19]

Inoue

[11] 4,191,027
[45] Mar. 4, 1980

[54] APPARATUS FOR COOLING BRINE

[75] Inventor: Wahei Inoue, Tokyo, Japan

[73] Assignee: Kabushiki Kaisah Maekawa Seisakusho, Tokyo, Japan

[21] Appl. No.: 819,267

[22] Filed: Jul. 27, 1977

[30] Foreign Application Priority Data

Jul. 29, 1976 [JP] Japan .................... 51-90509
Oct. 4, 1976 [JP] Japan .................... 51-119120
Dec. 23, 1976 [JP] Japan .................... 51-155216

[51] Int. Cl.² ........................................ F25D 17/02
[52] U.S. Cl. ........................ 62/185; 62/201; 62/434; 62/510; 236/1 E
[58] Field of Search .............. 62/185, 201, 434, 435, 62/510; 236/1 E; 165/101

[56] References Cited

U.S. PATENT DOCUMENTS

| | | | |
|---|---|---|---|
| 1,393,479 | 10/1921 | Zarucha | 165/101 |
| 1,397,116 | 11/1921 | Sparks | 165/101 |
| 1,406,256 | 2/1922 | Bretagne | 165/101 |
| 1,838,366 | 12/1931 | Dahl et al. | 62/434 |
| 1,962,580 | 6/1934 | Carpenter | 62/434 X |
| 2,008,407 | 7/1935 | Stoever | 62/510 X |
| 2,043,762 | 6/1936 | McCoy | 62/434 X |
| 2,044,811 | 6/1936 | Randel | 62/510 X |
| 2,105,882 | 1/1938 | Fleischer | 62/185 X |
| 2,124,291 | 7/1938 | Fleisher | 165/101 X |
| 2,278,242 | 3/1942 | Chapman | 236/1 E |
| 2,299,188 | 10/1942 | Stork et al. | 62/185 X |
| 3,211,373 | 10/1965 | Mitler | 236/1 E |
| 3,464,226 | 9/1969 | Kramer | 62/510 X |
| 3,693,708 | 9/1972 | Andoniev et al. | 165/101 |
| 3,775,995 | 12/1973 | Conley et al. | 62/510 X |
| 3,844,475 | 10/1974 | Kesterson et al. | 236/1 E |
| 3,922,876 | 12/1975 | Wetherington, Jr. et al. | 62/510 X |
| 3,964,891 | 6/1976 | Krieger | 62/510 X |
| 4,051,690 | 10/1977 | Doust | 62/436 |

FOREIGN PATENT DOCUMENTS

| | | | |
|---|---|---|---|
| 588566 | 11/1933 | Fed. Rep. of Germany | 62/185 |
| 31107 | 9/1933 | Netherlands | 62/185 |
| 282221 | 12/1964 | Netherlands | 165/101 |
| 7414399 | 11/1974 | Netherlands | 236/1 E |
| 404345 | 6/1966 | Switzerland | 62/510 |
| 788247 | 12/1957 | United Kingdom | 62/510 |

Primary Examiner—Leslie Braun
Attorney, Agent, or Firm—James E. Nilles

[57] ABSTRACT

An apparatus for cooling brine comprising a plurality of refrigerating units connected to a slow-current tank for brine in such a manner said refirgerating units are associated with successive portions of brine in said slow-current tank from the downstream side to the upstream side of said tank, one by one. The number of said refrigerating units taking part in the cooling work is increased and decreased in accordance with the temperature of said brine in said slow-current tank. The connection of said refrigerating units is selectively switched from series to parallel and vice versa with one another, with respect to the brine flow in said slow-current tank. Said means for switching the connection of said refrigerating units from series to parallel and vice versa are constituted by fluid element type shunting devices.

3 Claims, 10 Drawing Figures

APPARATUS FOR COOLING BRINE

The present invention relates to an apparatus for cooling brine having a plurality of refrigerating units.

In the field of deep-sea fishery, a large amount of brine of a temperature between $-20°$ and $-40°$ C. is used for the purpose of cold storage of fishes. Usually, for cooling the large amount of brine to such a low temperature, a plurality of refrigerating units are used, each of which having a compressor, condenser, expansion valve and evaporator.

These refrigerating units are operated in such a manner that the compressors bear equal share of load, so that it is difficult to control the brine temperature when the load fluctuates largely.

In order to overcome above described problem, the present invention provides in its one aspect an apparatus for cooling brine having a plurality of refrigerating units, wherein the plurality of refrigerating units are arranged in a slow-current tank of the brine in series with respect to the direction of the flow of the brine, the number of refrigerating units actually used and the cooling power of each refrigerating unit are increased or decreased by means of a controller associated with a temperature detector provided in the slow-current tank, in accordance with the fluctuation of the load, so as to cope with the load fluctuation over a wider range.

Although the above stated cooling apparatus can sustain a large load fluctuation, there still remains a problem unsolved. Namely, since the temperature of the brine in the slow-current tank varies such that it is relatively high at the brine-inlet side of the tank and relatively low at the brine-outlet side, the refrigerating units which are disposed in series with respect to the flow of brine are subjected to different thermal conditions. More specifically, the refrigerating units located at the downstream side have to take colder brine than those which are located at the upstream side. This means that the refrigerating units associated with the brine residing at the downstream side of the tank are subjected to smaller thermal loads, and the efficiencies in their evaporators are inconveniently deteriorated.

To avoid this inconvenience, according to another aspect of the invention, the aforementioned cooling apparatus in accordance with the first aspect of the invention is further improved such that at least two refrigerating units are connected in parallel with each other at their brine-intake side, so that the cooling power of the apparatus is increased as a whole.

According to still another aspect of the invention, the cooling apparatus as stated in connection with the second aspect is further improved to have means for switching the manner of mutual connection of the regrigerating units with respect to the flow of brine in the slow-current tank from series to parallel and vice versa, the switching means being constituted by a fluid-element type shunting device so as to render the construction of the apparatus simple, as compared with apparatus having switching means constituted by electromagnet valves, electrically driven valves or the like.

Figure 3:
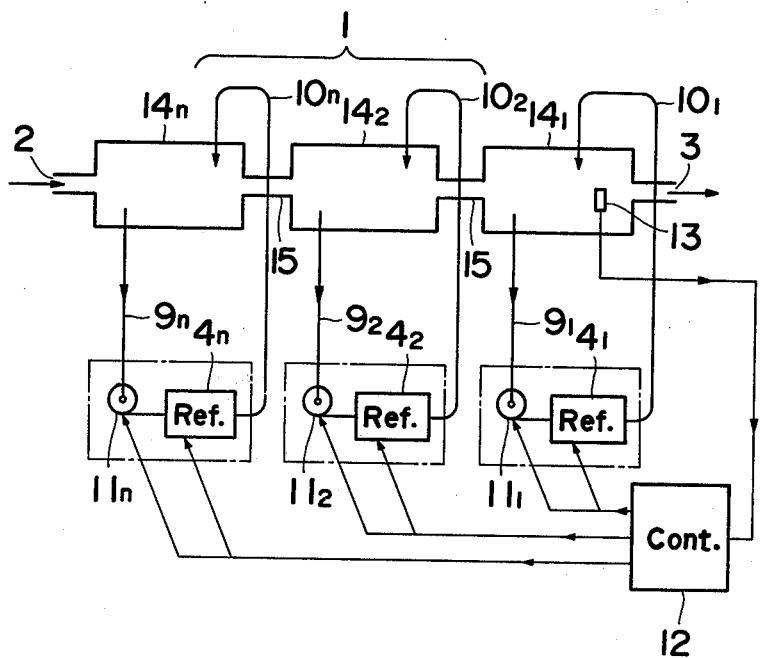
Figure 4:
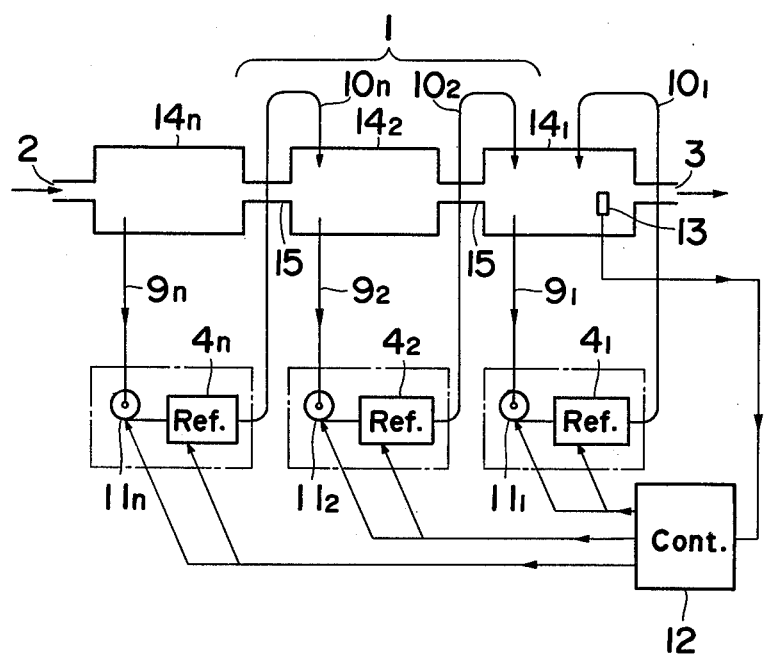
Figure 2:
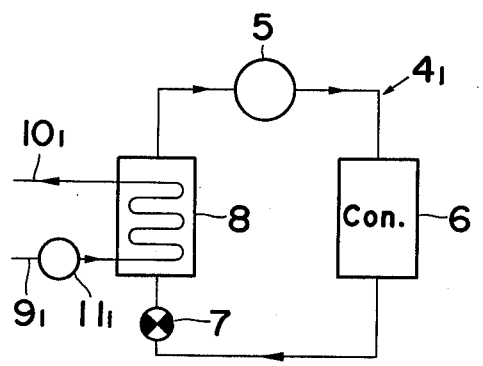
Figure 5:
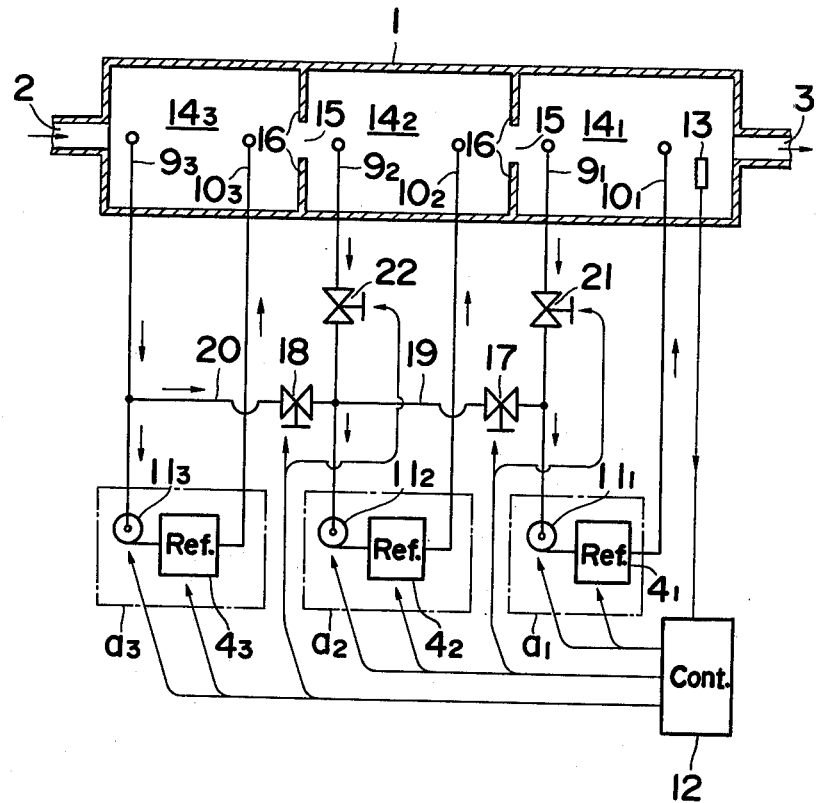
Figure 6:
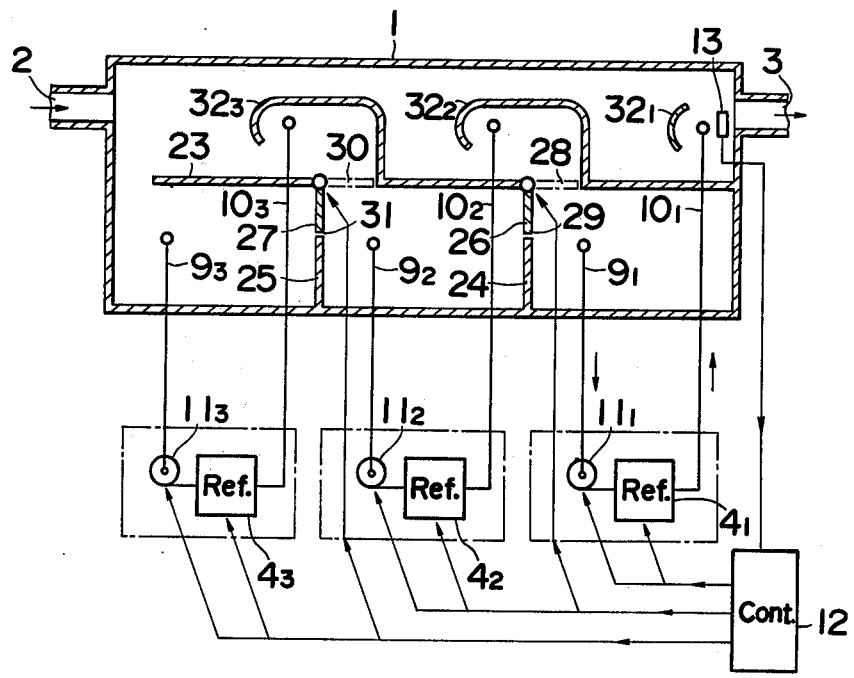
Figure 7:
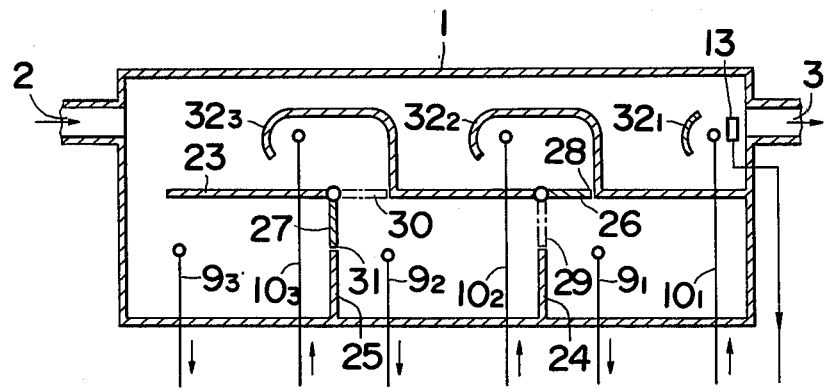
Figure 8:
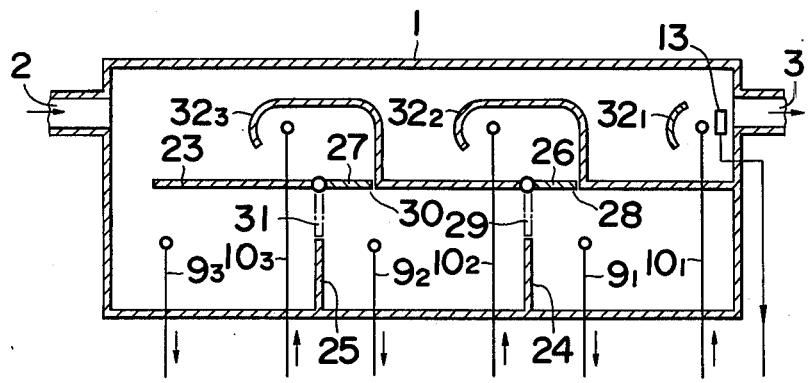
Figure 9:
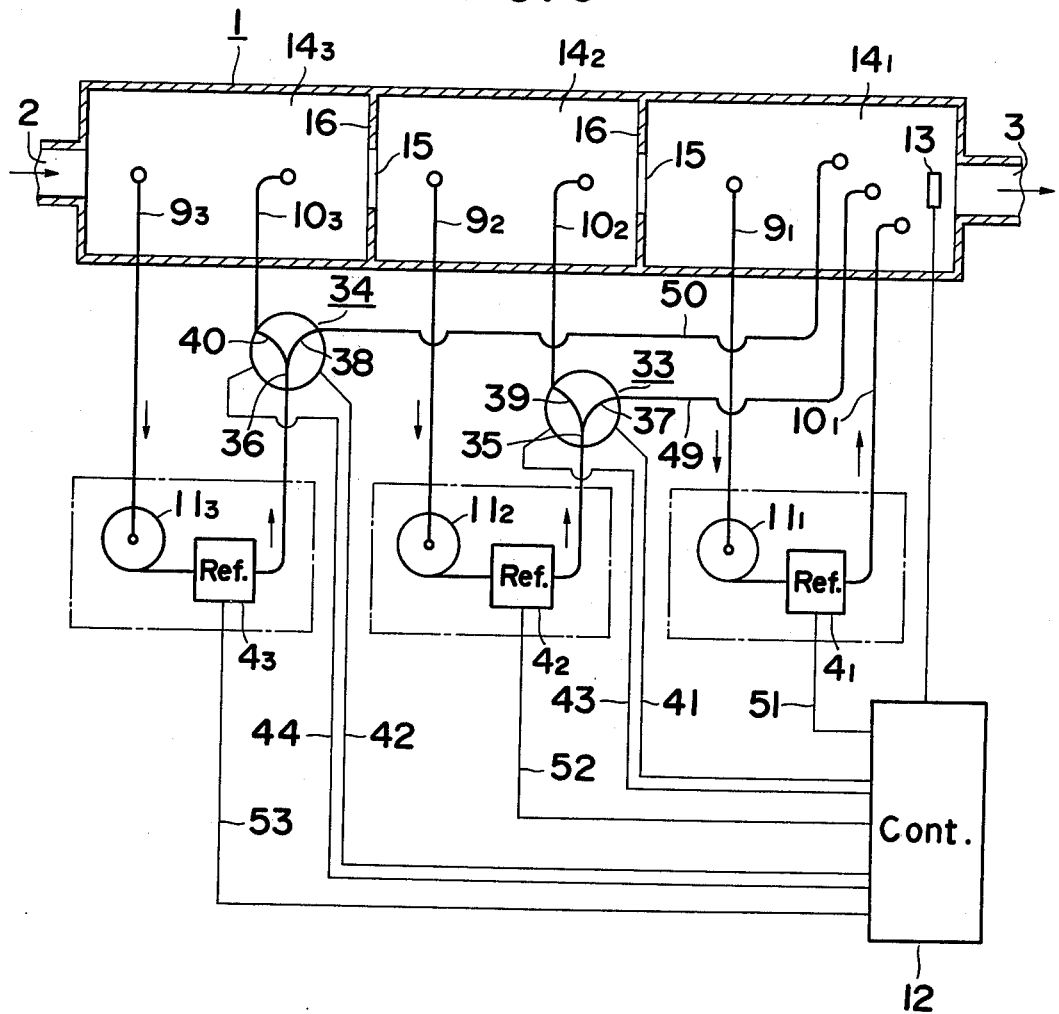
Figure 10:
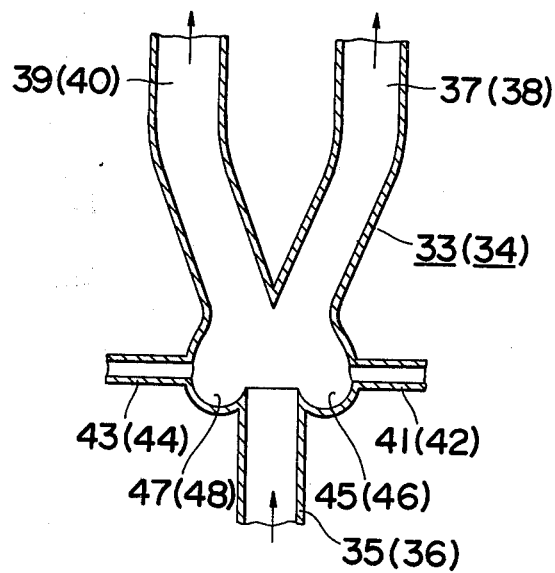

These and other objects, as well as advantageous features of the invention will become clear from the following description of the preferred embodiments taken in conjunction with the attached drawings in which:

FIG. 1 is an illustration for explaining the construction of a first embodiment of the present invention, FIG. 2 is an illustration showing an example of a refrigerating unit incorporated in the apparatus of the invention, FIGS. 3 and 4 are illustrations of different embodiments of the invention, FIGS. 5 and 6 shows different embodiments of the invention incorporating means for switching the connection of the refrigerating units from series to parallel and vice versa, FIGS. 7 and 8 are illustrations for explaining the manner of operation of the embodiment of FIG. 6, FIG. 9 is an illustration of an apparatus of the invention having switching means constituted by fluid-element type shunting device, and FIG. 10 is a sectional view of the fluid-element type shunting device.

Referring at first to FIG. 1, the brine to be cooled is adapted to flow gently through a slow-current tank 1, from inlet 2 to the outlet 3. A plurality of refrigerating units $4_1, 4_2 \ldots 4_n$ are associated with the slow-current tank 1 in the manner described later. Each of the refrigerating units consists of a compressor 5, condenser 6, expansion valve 7 and an evaporator 8, as shown in FIG. 2.

The evaporator of each refrigerating unit is connected to the slow-current tank 1 through a brine suction pipe 9 having a brine pump 11 and a brine discharge pipe 10, so that a heat exchange may be performed between the coolant circulated through the evaporator 8 and the brine taken into the evaporator by the brine pump 11.

The refrigerating units $4_1, 4_2, \ldots 4_n$ are arranged in series with respect to the flow of the brine, i.e., in such a manner that the unit $4_1$ is positioned at the downstream side of the tank 1 and the unit $4_n$ is at the upstream side of the tank 1 as viewed in the direction of the flow of brine through the slow-current tank 1.

The refrigerating units $4_1, 4_2 \ldots 4_n$, as well as the brine pumps $11_1, 11_2 \ldots 11_n$ are connected to a temperature controller 12 which is associated with a temperature detector 13 inserted into the slow-current tank 1 at the brine outlet side 3 of the latter 1. The temperature controller 12 is adapted to function electrically, in accordance with a deviation of the detected temperature of the brine from a predetermined temperature set in the temperature controller 12, so as to put the combinations of the refrigerating unit and the brine pump into operation, in such a manner that at first the combination of the refrigerating unit $4_1$ and the brine pump $11_1$ is started and then the number of combinations under operation is gradually increased until the last combination of the refrigerating unit $4_n$ and the brine pump $11_n$ comes into operation, depending on the magnitude of the above-mentioned deviation of the temperature.

As mentioned before, the refrigerating units $4_1, 4_2 \ldots 4_n$ are arranged in series with respect to the flow of the brine, from the downstream to the upstream sides in the mentioned order, i.e., in accordance with the order in which these units are brought into operation. More specifically, the brine suction pipe $9_1$, brine discharge pipe $10_1$, the brine suction pipe $9_2$, the brine discharge pipe $10_2 \ldots$ the brine suction pipe $9_n$ and the brine discharge pipe $10_n$ are arranged in accordance with the order in which the associated refrigerating units are brought into operation, from the downstream to the upstream sides of the slow-current tank 1, at a suitable pitch.

In operation, as the temperature of the brine flowing into the slow-current tank 1 through the brine-inlet side 2 comes higher than the temperature set at the controller 12, the first combination of the refrigerating unit and the brine pump, i.e., the refrigerating unit $4_1$ and the brine pump $11_1$, is turned on. The cooling power of the refrigerating unit $4_1$ is increased in accordance with the increase in the thermal load, so as to keep the temperature of brine flowing out of the slow-current tank 1 through the brine-outlet side end 3 constant.

A further increase of the temperature of brine flowing through the brine inlet side 2 causes the refrigerating unit $4_1$ to function to negate the temperature deviation, and, finally, the refrigerating unit $4_1$ comes to be obliged to perform its full-load operation.

As the temperature of the brine further gets higher, or the flow rate of the brine through the inlet side 2 is increased, the controller 12 acts to start the second combination of the refrigerating unit and the brine pump, i.e., the refrigerating unit $4_2$ and the brine pump $11_2$. Therefore, the brine discharged from the brine discharge pipe $10_1$ of the first unit $4_1$ is sucked into the second unit $4_2$ which is situated at the upstream side of the first unit $4_1$. The brine cooled by the second refrigerating unit $4_2$ is discharged to a portion in the slow-current tank 1 by the upstream side of the suction pipe $9_1$ of the first refrigerating unit but downstream side of the suction pipe $9_2$ of the second refrigerating unit $4_2$, so that the first refrigerating unit $4_1$ may take the brine which has been cooled already by the second refrigerating unit $4_2$.

Referring to another embodiment as shown in FIG. 3, the slow-current tank 1 for the brine is devided into a plurality of sections $14_1$, $14_2$ ... $14_n$. These sections are connected in series through passages 15, such that the first section $14_1$ is located at the outlet side, while the final section $14_n$ is located at the inlet side, in connection with the brine flow. Thus, the brine outlet side end of the first section $14_1$ forms the brine outlet port 3, while the brine inlet side end of the n th section 14 constitutes the brine inlet port 2 of the slow-current tank.

Brine suction pipes $9_1$, $9_2$ ... $9_n$ leading from upstream side portions of respective sections $14_1$, $14_2$ ... $14_n$ are connected, through respective brine pumps $11_1$, $11_2$ ... $11_n$, to corresponding refrigerating units $4_1$, $4_2$ ... $4_n$. Brine discharge pipes $10_1$, $10_2$ ... $10_n$ leading from respective units are connected to the downstream side portions of respective sections $14_1$, $14_2$ ... $14_n$. A temperature detector or a sensor 13 is inserted into the outlet-side end section $14_1$, near the brine outlet port 3, and is connected to temperature controller 12. This arrangement is substantially same as that of the embodiment of FIG. 1.

The cooling apparatus of this second embodiment functions almost in the same manner as the first embodiment.

However, since the slow-current flow tank is divided into sections $14_1$, $14_2$ ... $14_n$ corresponding to the refrigerating units $4_1$, $4_2$ ... $4_n$, with the brine suction and discharge pipes $9_1$, $9_2$ ... $9_n$ and $10_1$, $10_2$ ... $10_n$ of respective units connected to the corresponding slow-current tank sections, the refrigerating units are free from the influence of other refrigerating units. Consequently, the refrigerating units $4_1$, $4_2$ ... $4_n$ are stably controlled in accordance with orders given by the controller 12.

Referring now to still another embodiment as shown in FIG. 4, this cooling apparatus has a construction substantially same as that of the embodiment of FIG. 3, excepting that the brine discharge pipes $10_n$ ... $10_2$ from respective refrigerating units $4_n$ ... $4_2$ lead to the neighbouring downstream side tank sections $14_{n-1}$, ... $14_1$. This apparatus functions in the similar manner with the embodiment of FIG. 3. However, this embodiment is characterized in that the temperature differential between the inlet and outlet side ends in each tank section $14_1$, $14_2$ ... $14_n$ becomes large as it gets closer to the outlet side end of the tank.

In the foregoing embodiments, the refrigerating units $4_1$, $4_2$ ... $4_n$ and associated brine pumps $11_1$, $11_2$ ... $11_n$ are arranged in the mentioned order from the downstream to the upstream sides of the slow-current tank, it is to be noted here that the sequence or order in which the refrigerating units $4_1$, $4_2$ ... $4_n$ are brought into operation can be optionally changed by the switching in the controller 12. It will be seen that concentration of work to specific refrigerating unit can be avoided, and the operation times of all units are equalized, by periodically switching the operation order of the refrigerating units.

Hereinafter, an explanation will be made with specific reference to FIGS. 5 to 8, as to an embodiment which is arranged to allow a parallel connection of the refrigerating units to each other, with respect to the slow-current tank of the brine.

In FIG. 5, a brine slow-current tank 1 is shown to be divided by throttling walls 16, into a plurality of sections $14_1$, $14_2$, $14_3$ which are connected in series through a communication passage 15. A plurality of refrigerating units $4_1$, $4_2$, $4_3$ are associated with and connected to respective one of the sections $14_1$, $14_2$, $14_3$. Brine suction pipes $9_1$ and $9_2$ are connected to each other through a connection pipe 19 having a connection valve 17, while the brine suction pipes $9_2$ and $9_3$ are also connected to each other, through a connection pipe 20 having a connection valve 18. The brine suction pipes $9_1$ and $9_2$ are provided with respective suction valves 21 and 22 at their portions upstream sides of points at which they join the connecting pipes 19, 20. These connection valves 17, 18 and suction valves 21, 22 are operatively connected to the controller 12. The controller 12 is adapted to optionally close the connection valves 17, 18 and to open the suction valves 21, 22 to put the refrigerating units $4_1$, $4_2$, $4_3$ in series to each other, and to open the connection valve 17, 18 and close the suction valves 21, 22 for putting the units in parallel with one another with respect to the slow-current tank.

This cooling apparatus functions in the following manner.

A sensor 13 provided at the outlet side of the slow-current tank 1 is adapted to input a signal to the controller 12. Supposing that the detected temperature deviates from the set temperature of the brine to the higher side, the combination of the brine pump $11_1$ and the refrigerating units $4_1$ is started to commence the cooling of the brine. It is assumed here that the suction valves 21, 22 are opened and the connection valves 17, 18 are closed. The capacity of the compressor is further increased, when the deviation of the brine temperature is still in the higher side. It will be seen that the control of the cooling rate is effected through varying the capacity of the compressor, since the brine pump $11_1$ is electrically driven at a fixed speed to intake the correspondingly fixed rate of brine. Thus, the refrigerating unit $4_1$ comes to perform a full-load operation. If the signal demanding the further increase of the cooling capacity is still issued, the refrigerating unit $4_2$ located at the upstream side of the working unit $4_1$ is turned on, so that the refrigerating units $4_1$ and $4_2$ may exert a total output to cope with the thermal load. In this condition, the refrigerating units $4_1$ and $4_2$ are operated keeping a serial connection to each other, with respect to the brine slow-current tank 1, since the brine suction pipe $9_2$ is located at the upstream side of the refrigerating unit $4_1$.

When this serial operation of the refrigerating unit cannot sustain the thermal load, even by the full-load operation of the refrigerating units $4_1$ and $4_2$, the connection valve 17 which has been closed is opened, whereas the suction valve 21 which has been opened is closed. Then, the brine pump $11_1$ of the first refrigerating unit $4_1$ comes to suck the brine in the slow-current chamber, through the suction pipe $9_2$, suction valve 22 and the connection valve 17. Consequently, the refrigerating units $4_1$ and $4_2$ are brought into parallel with each other at their brine-inlet sides, with respect to the slow-current tank 1. Since the refrigerating unit comes to suck the brine of a higher temperature, the total cooling capacity is much increased by this parallel connection, than in the serial connection of the refrigerating units.

When the refrigerating unit $4_3$ is started, this is put in series to the parallel connection of the units $4_1$ and $4_2$. Then, as the new unit $4_3$ comes to perform its full-load operation, three units are connected in parallel with each other, by closing the suction valves 21, 22 and opening the connection valves 17, 18, with respect to the slow-current tank 1, by a common use of the suction pipe $9_3$. In the described embodiment, the switching of the valves 21, 22 and 17, 18 are effected at each time the newly joined refrigerating unit comes to perform its full-load operation. However, it is possible to control in such a manner that the valves are sequentially operated after putting the three units in series, so as to progressively establish the parallel connection. More specifically, after putting the three units in series, two of them are put in parallel with each other, and then, the remainder one unit is put in parallel with the two parallel units. However, such a control is not recommended, although it is simple to perform, from the view point of cooling effect.

The above stated manner of operation of this embodiment is well summarized in the following table 1.

In the embodiment of FIG. 5, the suction valves 21, 22 and connection valves 17, 18 may be combined with each other, such that the suction valve 21 and the connection valve 17 are combined to constitute a three-way valve, while the suction valve 22 and the connection valve 18 are combined to form another three-way valve.

Referring now to FIGS. 6 through 8 showing still another embodiment, the slow-current tank 1 for the brine is sectioned by a partition wall 23 which extends in parallel with the direction of brine flow and partition walls 24, 25 which are perpendicular to the direction of the brine flow. Switchable doors 26, 27 are provided at point where the partition wall 23 merges the partition walls 24, 25 respectively. Passages 28, 29, 30 and 31 are formed in the partition walls 23, 24, 25 so as to be opened and closed in accordance with the rotation of the switchable doors 26, 27.

The brine suction pipes $9_1$, $9_2$, $9_3$ and discharge pipes $10_1$, $10_2$, $10_3$ are connected to the slow-current tank 1 at opposite sides of the partition wall 23. Deflector plates $32_1$, $32_2$, $32_3$ are provided to confront one sides of respective openings of the discharge pipes $10_1$, $10_2$, $10_3$.

Table 1

| No. 1 Unit | | No. 2 Unit | | | | No. 3 Unit | | | | |
|---|---|---|---|---|---|---|---|---|---|---|
| Pump $11_1$ | Compressor | Pump $11_2$ | Compressor | valve 17 | Valve 21 | Pump $11_3$ | Compressor | Valve 18 | Valve 22 | Operation Mode |
| 0 | 0 | 0 | 0 | close | open | 0 | 0 | close | open | stop |
| start | start | " | " | " | " | " | " | " | " | No. 1 Unit start |
| " | capacity increase | " | " | " | " | " | " | " | " | Capacity Increases |
| " | Full load | " | " | " | " | " | " | " | " | No. 1 Unit full load |
| " | " | start | start | " | " | " | " | " | " | No. 2 Unit start |
| " | " | " | Capacity increase | " | " | " | " | " | " | Nos. 1, 2 Units Series |
| " | " | " | Full load | " | " | " | " | " | " | Nos. 1, 2 Units Full load |
| " | " | " | " | open | " | " | " | " | " | Series to Parallel |
| " | " | " | " | " | close | " | " | " | " | Nos. 1, 2 Parallel |
| " | " | " | " | " | " | start | start | " | " | No. 3 Unit start |
| " | " | " | " | " | " | " | Capacity increase | " | " | No. 3 series to parallel Nos. 1 and 2 |
| " | " | " | " | " | " | " | Full load | " | " | Nos. 1,2,3 Full Load |
| " | " | " | " | " | " | " | " | open | " | No. 3 series to para. |
| " | " | " | " | " | " | " | " | " | close | Nos. 1,2,3 Parallel |
| " | " | " | " | " | " | " | " | " | open | Capacity Decrease |

Other portions than described above are constructed in the similar manner with the embodiment of FIG. 5.

In operation, referring at first to FIG. 6 which shows a state in which the refrigerating unit $4_1$ is solely operated, the switchable doors 26, 27 are closing the passages 29 and 31. FIG. 7 shows the switchable doors switched for allowing the parallel operation of the refrigerating units $4_1$ and $4_2$, after the unit $4_2$ has taken part in the work and has reached its full-load condition. FIG. 8 shows the condition of parallel connection of the refrigerating units $4_1$, $4_2$, $4_3$, working at their maximum power, after the third unit $4_3$ has taken part in the work in series to the parallelly connected two units $4_1$, $4_2$ and then reached its full-load operating condition. It will be seen that the third unit $4_3$ is switched from series to parallel condition by closing the passage 30 by the switchable door 27.

FIGS. 9 and 10 show still another embodiment, in which a fluid-element type shunting device is used for switching the connection of refrigerating units from series to parallel and vice versa, with respect to the brine slow-current tank.

In the construction as shown in FIG. 9, the slow-current tank 1, refrigerating units $4_1$, $4_2$, $4_3$, brine pumps $11_1$, $11_2$, $11_3$, and the temperature controller connected to the units and pumps are same as the embodiment of FIG. 5.

Fluid-element type shunting devices 33, 34 are provided in the brine discharge pipes $10_2$, $10_3$ of the refrigerating units $4_2$, $4_3$, respectively.

As shown in FIG. 10, the fluid-element type shunting devices 33, 34 are constituted, respectively, by inlet flow pipes 35, 36 adapted to be connected to the discharge side of respective refrigerating units $4_2$, $4_3$, shunting pipes 37, 38, 39, 40 adapted to direct the flow of brine from the inlet flow pipes 35, 36 in either one of two directions, and controlling pipes 41, 42, 43, 44 adapted to restrict the flow of brine to one of the two directions. The arrangement is such that the pressure in the chambers 45, 46 overcomes that in the chambers 47, 48, thereby to direct the brine flow through the inlet flow pipes 35, 36 to the left-hand side shunting pipes 39, 40, as viewed on the drawings, when the control pipes 41, 42 are opened to atmosphere and control pipes 43, 44 are closed. To the contrary, when the controlling pipes 41, 42 are closed and the other two 43, 44 are opened, the flow of brine is directed to the right-hand side shunting pipes 37, 38.

One 39, 40 of the shunting pipes of each fluid-element type shunting device 33, 34 is connected to each section $14_2$, $14_3$ of the tank, through the discharge pipe $10_2$, $10_3$, while the other shunting pipe 37, 38 in each shunting device is connected to the slow-current tank 1 to open at portions of the latter close to the outlet port 3, through outlet pipes 49, 50. The discharge pipe $10_1$ of the refrigerating unit $4_1$ opens also in the vicinity of the outlet port 3.

Between the area at which the discharge pipes 49, 50, $10_1$ open and the outlet port 3, disposed is the temperatue senser 13 operatively connected to the temperature controller 12. The output circuits 51, 52, 53 of the controller 12 are connected to the compressors of the units $4_1$, $4_2$, $4_3$ to control the capacities of the latter. The output of the controller 12 is connected also to the controlling pipes 41, 42, 43, 44 of the fluid-element type shunting devices 33, 34.

In operation, as the thermal load of the brine increases from the condition of FIG. 9, the resultant temperature rise of the brine is sensed by the temperature sensor 13, and is put into comparison with the set temperature in the controller 12. The first refrigerating unit $4_1$ and its associated brine pump $11_1$ are started in accordance with the temperature deviation, and the capacity of the compressor of the unit is gradually increased. When the full-load operation of the unit $4_1$ cannot sustain the thermal load, the second unit $4_2$ and its associated brine pump $11_2$ are started, and the capacity of the compressor is gradually increased. In this state, since the controlling pipe 43 of the fluid-element type shunting device 33 is closed, while the other controlling pipe 41 is opened to atmosphere, the brine cooled by the second unit $4_2$ is discharged into the discharge pipe $10_2$ through the shunting pipe 39. Thus, in this condition, the first and the second refrigerating units $4_1$ and $4_2$ are in series relation to each other, through the slow-current tank 1.

A further increase of the thermal load causes the controlling pipe 43 to open to atmosphere and the controlling pipe 41 is closed. Consequently, the brine flowing through the inlet flow pipe 35 is discharged into the downstream-side end chamber $14_1$, through the shunting pipe 37 and the discharge pipe 49. It will be seen that the refrigerating units $4_1$ and $4_2$ are now in parallel relation to each other to perform a larger cooling effort than could be obtained by series connection. This increase of cooling effort is attributed to the fact that the temperature differential in the heat exchanger (not shown) of the refrigerating unit $4_2$ is increased to enhance the cooling capacity.

It is impossible to effectively operate the refrigerating unit corresponding to the increasing thermal load, by solely switching the connection of the brine flow from series to parallel by means of the fluid element-type shunting device. Thus, it is necessary to increase the output of the refrigerating unit $4_2$, to an extent as high as that of the first unit $4_1$.

Therefore, a discontinuity of control is caused at the time of switching from series to parallel.

In general, since the first unit $4_1$ has reached its full-load condition and the second unit $4_2$ has also reached its full-load condition, but still cannot sustain the thermal load, at the time of switching from series to parallel. Therefore, the discontinuity of control is not so serious.

However, when a more precise control is required, the discontinuity of the control can be negated by simultaneously controlling the compressors of the refrigerating units $4_1$, $4_2$ in such a manner that the capacity of the unit $4_1$ is decreased, while the capacity of the unit $4_2$ is increased, to obtain a smooth transient characteristic at the time of switching from series to parallel.

It will be clear to those skilled in the art that the fluid-element type shunting device 34 functions at first to connect the third refrigerating unit $4_3$ to the parallel units $4_1$ and $4_2$ and, then, in accordance with the increase of the load, functions to switch to connect the third unit $4_3$ in parallel with the parallel units, thereby to afford the full-power operation of the cooling apparatus.

The switching from series to parallel may be effected by controlling the opening and closing of the controlling pipes 41, 42, 43, 44 of the fluid-element type shunting devices 33, 34 by a pumping pressure caused by the starting of the brine pumps $11_1$ or $11_2$ of the previous stage, insteadly of relying upon the direct control of the shunting devices by the temperature controller 12.

At the same time, it is possible to operate the apparatus in such a manner that the first, second and the third units $4_1$, $4_2$ and $4_3$ are successively put into series operation in the mentioned order and then successively changed into parallel operation, one by one.

The flow circuit of the controlling pipe can be simplified by employing a mono-stable type fluid-element shunting device having only one controlling pipe, in place of the described bi-stable fluid-element type shunting device 33, 34 which is controlled by a pair of controlling pipes 41, 42; 43, 44.

The described cooling apparatus can be used for cooling liquids other than the mentioned brine.

As has been described, according to the invention, there is provided a cooling apparatus in which a plurality of refrigerating units are disposed for communication with successive portions of a slow-current tank in order, from downstream side to the upstream side, the units being operated in series with respect to the brine flow in the slow-current tank, the number of units taking part in the work being increased and decreased as the thermal load is increased and decreased.

Therefore, the apparatus of the invention can cope with a larger range of load fluctuation, than the conventional apparatus in which a plurality of refrigerating units are simultaneously operated at partial loads.

In addition, by arranging such that the plurality of refrigerating units are connected in parallel one another with equivalent shares of load simultaneously, at the time of changing the number of units actually used, the variation of load on the units is fairly avoided to prevent the cooling capacity from being lowered by a too small-load application to a specific unit.

At the same time, the fluid-element type shunting device used for switching the connection of the units from series to parallel and vice versa can be operated with an extremely small energy, since it has no sliding part as involved in the conventional switching means such as electromagnet valve and electrically driven valve, and, therefore, ensures a high speed of response, without the fear of water-hammering, contributing greatly to make the switching operation smooth and safe.

What is claimed is:

1. An apparatus for cooling brine comprising a slow-current tank for brine having an inlet and an outlet between which brine flows in a slow current, a plurality of independently operable refrigerating units for cooling successive portions of brine from said tank, each unit having an evaporator located remote from said tank and having a suction pipe and a discharge pipe connected to the brine in said tank, temperature detecting means for detecting the temperature of brine in said tank near said outlet of said tank, and a controller responsive to said temperature-detecting means for controlling the operation of said plurality of refrigerating units to increase or decrease the number of said refrigerating units in operation and taking part in the cooling work in accordance with the temperature of brine to maintain said brine at a constant predetermined temperature.

2. An apparatus for cooling brine as claimed in claim 1, wherein means are provided and are operated by said controller for selectively switching the connection of said refrigerating units from series to parallel and vice versa with one another, with respect to the brine flow in said tank to change the total cooling capacity of the apparatus.

3. An apparatus for cooling brine as claimed in claim 2, wherein said means for switching the connection of said refrigerating units from series to parallel and vice versa comprise fluid-element type shunting devices connected in at least some of the discharge pipes of said refrigerating units.

* * * * *